(12) United States Patent
Westergaard et al.

(10) Patent No.: US 9,746,099 B2
(45) Date of Patent: Aug. 29, 2017

(54) SAFETY LOCK FOR A GATE VALVE

(71) Applicants: Heine Westergaard, Vermillion (CA); Per Westergaard, Vermillion (CA)

(72) Inventors: Heine Westergaard, Vermillion (CA); Per Westergaard, Vermillion (CA)

(*) Notice: Subject to any disclaimer, the term of this patent is extended or adjusted under 35 U.S.C. 154(b) by 0 days.

(21) Appl. No.: 14/703,047

(22) Filed: May 4, 2015

(65) Prior Publication Data
US 2016/0161032 A1    Jun. 9, 2016

Related U.S. Application Data

(60) Provisional application No. 62/088,271, filed on Dec. 5, 2014.

(30) Foreign Application Priority Data

Feb. 5, 2015  (CA) ...................................... 2881171

(51) Int. Cl.
| | |
|---|---|
| *F16K 35/10* | (2006.01) |
| *F16L 35/00* | (2006.01) |
| *F16K 31/60* | (2006.01) |
| *F16L 23/00* | (2006.01) |

(52) U.S. Cl.
CPC .............. *F16K 31/60* (2013.01); *F16K 35/10* (2013.01); *F16L 35/00* (2013.01); *F16L 23/006* (2013.01); *F16L 2201/20* (2013.01)

(58) Field of Classification Search
CPC ........ F16K 35/025; F16K 35/06; F16K 35/10; F16K 31/60; F16L 35/00; F16L 37/20; F16L 57/00; F16L 23/006; F16L 2201/20

USPC .......... 70/175–180, 199, 200, 202, 203, 211, 70/212, 238; 137/383–385, 377; 251/89, 251/90
See application file for complete search history.

(56) References Cited

U.S. PATENT DOCUMENTS

| | | | | | |
|---|---|---|---|---|---|
| 480,359 | A | * | 8/1892 | Zimmermann, Jr. | ... E05B 45/06 137/385 |
| 595,886 | A | * | 12/1897 | Mullen | .... F16K 35/10 126/42 |
| 598,211 | A | * | 2/1898 | Toback | ................... E05B 45/06 137/385 |
| 691,986 | A | * | 1/1902 | Toback | ................... E05B 45/06 137/385 |

(Continued)

FOREIGN PATENT DOCUMENTS

WO    2010/069081 A1    6/2010

*Primary Examiner* — Kevin Murphy
*Assistant Examiner* — Josephine Trinidad-Borges
(74) *Attorney, Agent, or Firm* — Seed IP Law Group LLP

(57) ABSTRACT

There is provided a safety lock for a hose connector and valve on a flow line having an anchor that is in a fixed position relative to the valve, a movable body movably attached to the anchor, and a shroud and an actuator blocking member carried by the movable body. The shroud is sized and positioned on the movable body to limit access to the hose connector when the movable body is in a first position, and to permit access to the hose connector when the movable body is in a second position. The actuator blocking member is sized and positioned on the movable body to prevent the valve actuator from moving from a second to a first position when the movable body is in the second position, and to permit movement of the actuator when the movable body is in the first position.

28 Claims, 9 Drawing Sheets

(56) References Cited

U.S. PATENT DOCUMENTS

| | | | | |
|---|---|---|---|---|
| 950,204 | A | * | 2/1910 | Drown .................... F16K 51/02 251/288 |
| 1,887,677 | A | | 11/1932 | Gamble |
| 2,925,247 | A | * | 2/1960 | Fletcher .................... F16K 1/10 251/192 |
| 3,980,099 | A | * | 9/1976 | Youngblood ........... F16K 35/10 137/382 |
| 4,103,712 | A | | 8/1978 | Fletcher et al. |
| 4,132,385 | A | | 1/1979 | DeRouen et al. |
| 4,230,345 | A | | 10/1980 | Boelkins |
| 4,397,332 | A | | 8/1983 | Sample |
| 4,515,182 | A | | 5/1985 | LeDevehat |
| 4,681,134 | A | * | 7/1987 | Paris, Sr. ................ F16K 35/10 137/382 |
| 4,803,858 | A | | 2/1989 | Parker |
| 4,962,785 | A | * | 10/1990 | Clifford ................ F16K 3/0281 137/383 |
| 4,982,929 | A | | 1/1991 | Spurling |
| 6,736,367 | B2 | | 5/2004 | Scobie |
| 7,147,004 | B1 | | 12/2006 | Hartman |
| 7,703,812 | B2 | * | 4/2010 | Asam .................... E02F 9/2275 285/124.3 |
| 8,074,959 | B2 | | 12/2011 | Sledz |
| 8,132,781 | B2 | | 3/2012 | Haunhorst |
| 2002/0171057 | A1 | * | 11/2002 | Scobie .................... F16K 35/00 251/149.9 |
| 2009/0205722 | A1 | * | 8/2009 | Sledz .................... F16K 35/025 137/383 |
| 2013/0160870 | A1 | * | 6/2013 | Rohde .................... F16K 35/06 137/383 |
| 2014/0026966 | A1 | | 1/2014 | Kowerchuk et al. |

\* cited by examiner

SAFETY LOCK FOR A GATE VALVE

BACKGROUND

Technical Field

This relates to a safety lock for a gate valve.

Description of the Related Art

In fluid systems, it is common to provide a valve, such as a gate valve, at a connection point. In the oil and gas industry, it is common to load or offload fluid by a hose that is connected to the connection point by a hose connector, which is generally a camlock fitting according to industry standard. One common problem that occurs at these connection points is that operators will sometimes forget to close the gate valve prior to releasing the hose connector. Some examples of safety devices to prevent a valve and a hose connector from opening at the same time include U.S. Pat. No. 6,736,367 (Scobie) entitled "Hose coupling lock for a valve and method of use of the same" and United States Pre-Grant Publication No. 2014/0026966 (Kowerchuk) entitled "Coupling safety apparatus for a lever activated valve."

BRIEF SUMMARY

According to an aspect, there is provided a safety lock for a hose connector and valve on a flow line. The valve comprises an actuator that moves between a first position and a second position as the valve moves between an open position and a closed position, respectively. The safety lock comprises an anchor that is in a fixed position relative to the valve. A movable body is movably attached to the anchor, the anchor permitting lateral movement of the movable body in an axial direction of the fluid line between an extended position and a retracted position. A shroud and an actuator blocking member are carried by and move laterally with the movable body, wherein the shroud is sized and positioned on the movable body to limit access to the hose connector when the movable body is in the first position and to permit access to the hose connector when the movable body is in the second position. The actuator blocking member is sized and positioned on the movable body to prevent the actuator from moving from the second position to the first position when the movable body is in the second position, and to permit movement of the actuator when the movable body is in the first position.

According to another aspect, the hose connector may be a camlock connection comprising a male connector and a female connector, one of the male connector and the female connector being mounted to the flow line. The female connector has one or more locking arms that pivot between a locked position and an unlocked position to selectively lock the female connector to the male connector, and the shroud may be sized and positioned on the movable body to prevent pivotal movement of the one or more locking arms of the female connector from the locked position when the movable body is in the first position and to permit pivotal movement of the locking arms when the movable body is in the second position.

According to another aspect, the valve may be a gate valve, the actuator may be an actuator shaft, and the first and second positions of the actuator shaft may be extended and retracted positions relative to the gate valve.

According to another aspect, the gate valve blocking member may be positioned to block the movable body from moving to the second position when the actuator shaft is in the extended position.

According to another aspect, the shroud may be attached to a bottom of the movable body, and the gate valve blocking member may be attached to the top of the movable body, the gate valve blocking member being positioned above and extending toward the gate valve.

According to another aspect, the actuator shaft may comprise a threaded shaft that is operated by a hand wheel.

According to another aspect, the valve may be a ball valve, the actuator may be a handle that is pivotally attached to the ball valve, and the first and second positions of the handle may be first and second pivotal positions relative to the ball valve.

According to another aspect, the handle may comprise a plate that pivots with the handle, the actuator blocking member engaging the plate to prevent the handle from moving from the second position to the first position when the movable body is in the second position.

According to another aspect, the anchor and the movable body may comprise a sliding connection that slides in a direction that is parallel to a flow axis of the flow line.

According to another aspect, the shroud and the actuator blocking member may be fixedly attached to the movable body.

According to another aspect, the shroud may comprise an enclosure that radially encloses the hose connector.

According to another aspect, the anchor may comprise one or more apertures that slidably receive elongate members of the movable body.

According to another aspect, the anchor may be attached to one or more flange bolts of a flange of the valve.

According to another aspect, the shroud may be sized to receive a flowline flange in the second position.

According to an aspect, there is provided in combination a hose connector connected to a flow line, a valve connected to the flow line adjacent to the hose connector, the valve comprising an actuator that moves between a first position when the valve is in an open position and a second position when the valve is in a closed position, a safety lock comprising an anchor that is in a fixed position relative to the valve, a movable body movably attached to the anchor, the anchor permitting lateral movement of the movable body in an axial direction of the flow line between an extended position and a retracted position, a shroud and an actuator blocking member carried by and movable laterally with the movable body, wherein the shroud is sized and positioned on the movable body to limit access to the hose connector when the movable body is in the first position and to permit access to the hose connector when the movable body is in the second position, and the actuator blocking member is sized and positioned on the movable body to prevent the actuator from moving from the second position to the first position when the movable body is in the second position, and to permit movement of the actuator when the movable body is in the first position.

According to another aspect, the hose connector may be a camlock fitting comprising one of a male connector and a female connector, the female connector having pivoting locking arms that selectively lock the female connector to the male connector, and the shroud may be a camlock shroud sized and positioned on the movable body to prevent pivotal movement of the one or more locking arms of the female connector from the locked position when the movable body is in the first position and to permit pivotal movement of the locking arms when the movable body is in the second position.

According to another aspect, the valve may be a gate valve, the actuator may be an actuator shaft, and the first and second positions of the actuator shaft may be extended and retracted positions relative to the gate valve.

According to another aspect, the gate valve blocking member may be positioned to block the movable body from moving to the second position when the actuator shaft is in the extended position.

According to another aspect, the shroud may be attached to a bottom of the movable body, and the gate valve blocking member is attached to the top of the movable body, the gate valve blocking member being positioned above and extending toward the gate valve.

According to another aspect, the actuator shaft may comprise a threaded shaft that is operated by a hand wheel.

According to another aspect, the valve may be a ball valve, the actuator may be a handle that is pivotally attached to the ball valve, and the first and second positions of the handle may be first and second pivotal positions relative to the ball valve.

According to another aspect, the handle may comprise a plate that pivots with the handle, the actuator blocking member engaging the plate to prevent the handle from moving from the second position to the first position when the movable body is in the second position.

According to another aspect, the anchor may engage the movable body by a sliding connection that slides in a direction that is parallel to a flow axis of the flow line.

According to another aspect, the shroud and the actuator blocking member may be fixedly attached to the movable body.

According to another aspect, the shroud may comprise an enclosure that radially encloses the hose connector.

According to another aspect, the anchor may comprise one or more apertures that slidably receive elongate members of the movable body.

According to another aspect, the anchor may be attached to one or more flange bolts of a flange of the valve.

According to another aspect, the shroud may be sized to receive a flowline flange in the second position.

BRIEF DESCRIPTION OF THE SEVERAL VIEWS OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
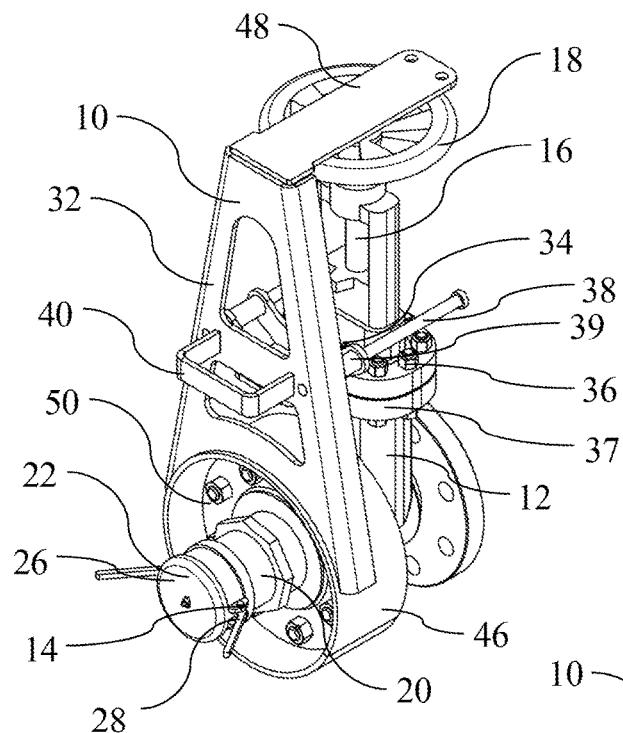
FIG. 1 is a perspective view of a safety lock installed on a capped flow line with a gate valve.

A safety lock generally identified by reference numeral 10, will now be described with reference to FIGS. 1 through 15. A gate valve version will be described with respect to FIGS. 1-7 and a ball valve version will be described with respect to FIGS. 8-12. The following embodiments will be discussed with respect to camlock connections. However, it will be understood that other hose connectors may be used to connect the flow line to the valve. The hose connector may be any type of connection suitable to connect hoses to flow lines in order to load or offload liquid.

Referring to FIG. 1, there is shown a safety lock 10 for use with a gate valve 12 and camlock fitting 14 on a flow line (not shown). Safety lock 10 is used to prevent both gate valve 12 and camlock fitting 14 from being opened at the same time.

Gate valve 12 may be any known type of gate valve that is selectively opened and closed by moving a gate controlled by an actuator shaft 16 that moves laterally outward from gate valve 12. As shown, actuator shaft 16 is a threaded shaft that is moved by rotating a hand wheel 18 between an extended position and a retracted position. Actuator shaft 16 may be actuated in other ways.

Figure 2:
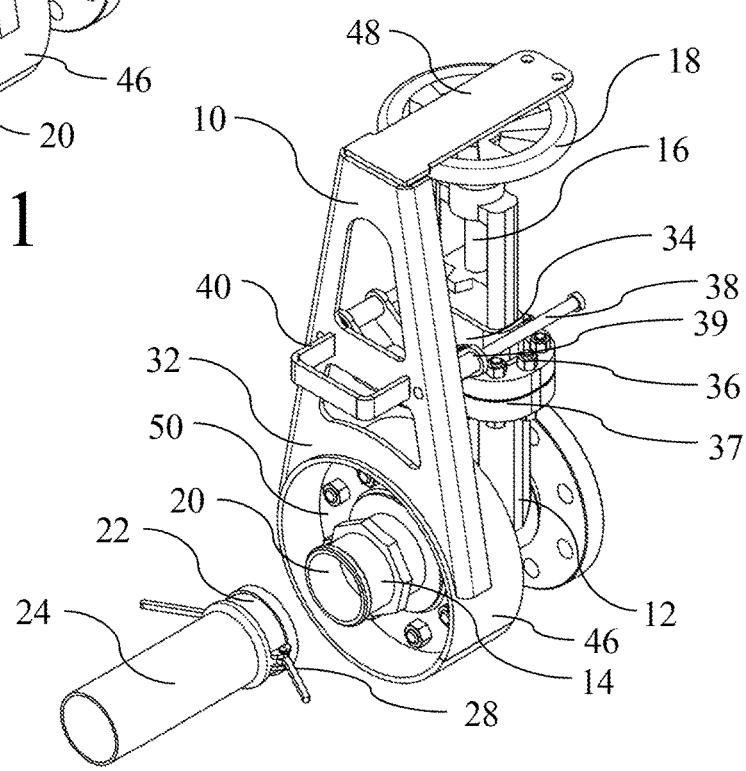
FIG. 2 is a perspective view of a safety lock with a disconnected hose.

Referring to FIG. 2, camlock fitting 14 has a male connector 20 and a female connector 22. As shown, male connector 20 is mounted to gate valve 12 and therefore to the fluid line and female connector 22 is carried by a hose 24 that is to be connected to male connector 20. Referring to FIG. 1, female connector may also be part of a cap 26. Female connector 22 has pivoting locking arms 28 that selectively lock female connector 22 to male connector 20.

Safety lock 10 is designed to have a movable body 32 that moves laterally in the axial direction of camlock fitting 14. Movable body 32 is mounted to an anchor 34 that is immovably fixed relative to gate valve 12. This may be done by attaching anchor 34 to the flange bolts 36 of a flange 37 of gate valve 12 as shown. Anchor 34 may also be attached to other components, such as camlock fitting 14, the flow line, etc. that are also fixed relative to gate valve 12. As shown, anchor 34 has sliding sleeves 39 that receive pins 38. Movable body 32 can then be moved by applying a lateral force, such as by using handle 40, to movable body 32 by causing pins 38 to slide within sleeves 39. Other designs that permit lateral movement may also be used, such as by reversing the positions of sleeves 39 and pins 38, or by providing other types of lateral actuators as are known in the art.

Referring to FIG. 1, movable body 32 carries camlock shroud 46 and a gate valve blocking member 48. As shown, both camlock shroud 46 and gate valve blocking member 48 are in a fixed position relative to movable body 32 with camlock shroud 46 carried at the bottom of movable body 32 and gate valve blocking member 48 carried at the top of movable body 32. It will be understood that the actual point of attachment to movable body 32 may be varied as long as an appropriate position of shroud 46 and blocking member 48 relative to camlock fitting 14 and gate valve 12 is achieved. In some embodiments, the position of either or both of camlock shroud 46 and blocking member 48 may be adjustable to suit different connection point assemblies. In other embodiments, the position may be set to suit a specific size of assembly.

Referring to FIGS. 1 and 2, camlock shroud 46 is sized such that, when positioned adjacent to camlock fitting 14, locking arms 28 are blocked from pivoting from the closed or locked position, in which female connector 22 is locked to male connector 20, to the open position, in which female connector 22 is released from male connector 20. While camlock shroud 46 is shown as a full enclosure that blocks both locking arms 28 and is positioned concentrically with camlock fitting 14, it will be understood that other shapes or designs may be used for camlock shroud 46. As one of the uses of shroud 46 is to remind the operator to ensure it is safe to open locking arms 28, it may be sufficient to have shroud 46 block only one locking arm 28. Furthermore, shroud 46 may engage any part of locking arms 28 that allows the pivoting movement to be limited, such as the ends or middle of locking arms 28.

In the depicted embodiment, shroud 46 is shown as a cylindrical sidewall concentrically positioned about camlock fitting 14. Shroud 46 is sized to block locking arms 28 and also to fit over a connection flange 50 that connects camlock fitting 14 to gate valve 12. This size of shroud 46 is necessary to ensure that shroud is able to be retracted from camlock fitting 14 in the depicted embodiment, but may not be necessary in all embodiments, depending on the specifications of the various components.

It will be understood that there are other considerations for the size and shape of shroud 46, some of which may depend on the type of hose connector being used, if the depicted camlock connector 20 and 22 is not used. For examples, in some circumstances, and depending on the type of hose connector, shroud 46 may limit access to the hose connector by being positioned such that the hose connector is physically prevented from being disconnected, as with locking arms 28 of female camlock connector 22 described above. In other circumstances, shroud 46 may be used to limit access to the hose connector by enclosing the hose connector, extending past the hose connector, or otherwise in order to prevent or make it difficult for the user to access and operate the connector.

Figure 3:
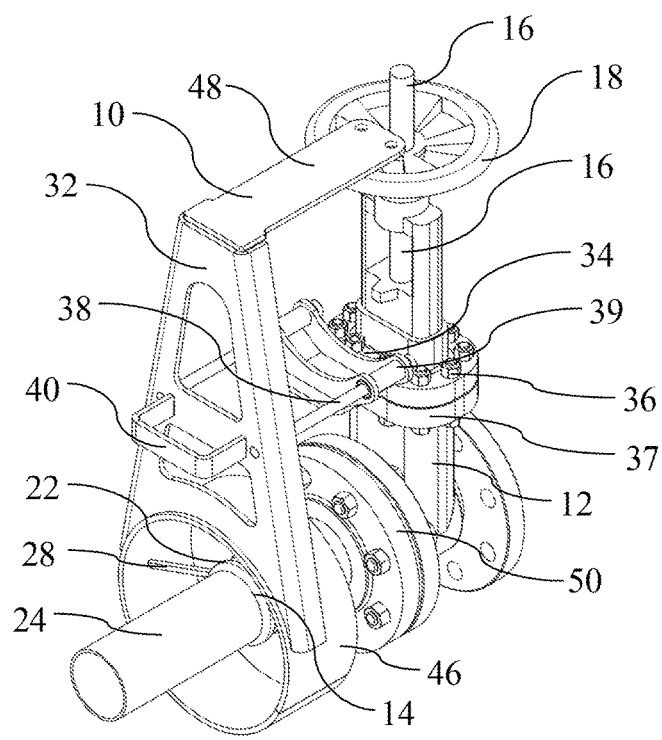
FIG. 3 is a perspective view of a safety lock in a position that locks the camlock adjacent to the gate valve.

Gate valve blocking member 48 is shown as a flat bar that extends out from the top of movable body 32. Other sizes and shapes may also be used that can provide the same effects in the extended and retracted positions of movable body 32 discussed herein. Gate valve blocking member 48 is positioned above gate valve 12 to prevent actuator shaft 16 from moving to any significant degree when movable body 32 is in a retracted position. While some movement may be permitted, particularly because gate valve blocking member 48 is cantilevered from movable body 32 and may be levered upward by an upward force that may be applied by actuator shaft 16. However, gate valve blocking member 48 is designed and positioned to prevent the gate in gate valve 12 from moving from the closed position to the open position, or sufficiently to allow any significant amount of fluid flow through gate valve 12, as shown in FIGS. 1 and 2. At the same time, gate valve blocking member 48 is sufficiently short to permit the free movement of actuator shaft 16 when movable body 32 is in the extended position, as shown in FIG. 3.

Figure 4:
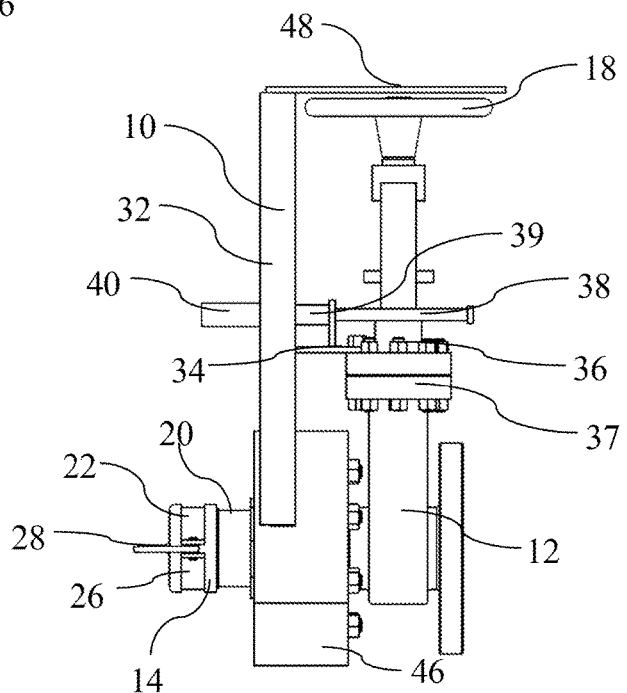
FIG. 4 is a side elevation view of a safety lock installed on a capped flow line adjacent to the gate valve.

Referring to FIG. 4, safety device 10 is installed on a gate valve 12 and camlock fitting 14, which may be referred to as a connection point, such as may be used to connect to a fluid supply system to load into or offload fluid from the fluid supply system. As depicted, camlock fitting 14 has a cap 26 that is a female connection 22 connected to male connection 20. As depicted, safety device 10 is installed by attaching anchor 34 to gate valve 12, or another object that is fixed relative to gate valve 12 or camlock fitting 14, with movable body 32 mounted to anchor 34 such that it is able to move laterally between an extended position and a retracted position.

Figure 5:
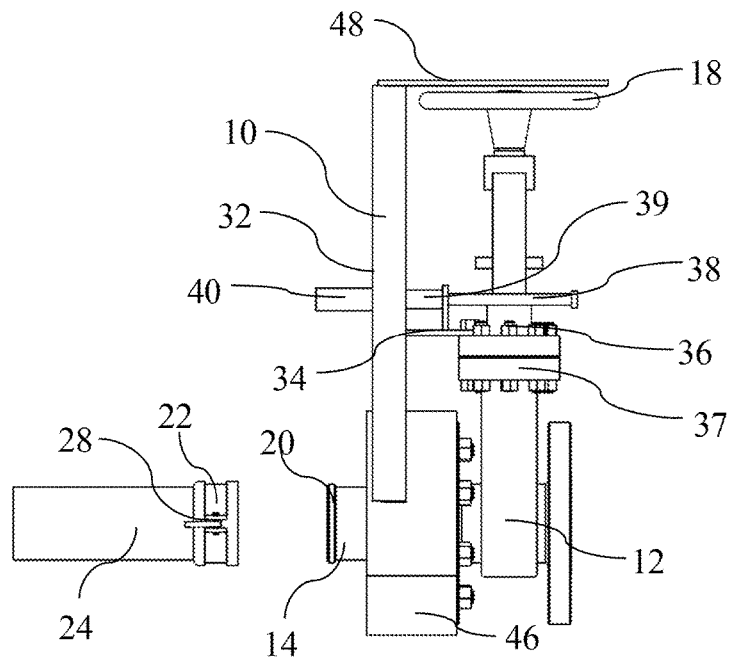
FIG. 5 is a side elevation view of a safety lock with a disconnected hose adjacent to the gate valve.

FIG. 4 depicts movable body 32 in the retracted position, where camlock shroud 46 is retracted from camlock fitting 14 to allow the free movement of locking arms 28 in order to remove cap 26 and attach a female connection 22 on hose 24, as shown in FIG. 5. In the retracted position shown in FIGS. 4 and 5, movable body 32 has positioned gate valve blocking member 48 above gate valve 12 to prevent actuator shaft 16 from moving axially away from gate valve 12 and permitting gate valve 12 to open. As such, safety device 10 prevents gate valve 12 from opening while camlock fitting 14 is able to be opened and closed by pivoting locking arms 28 freely between the open and closed positions.

Figure 6:
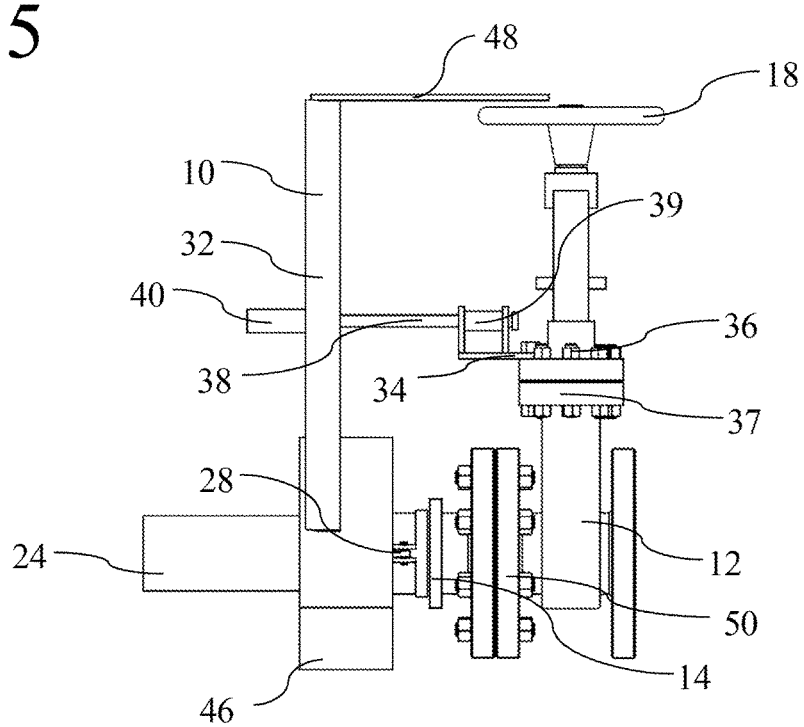
FIG. 6 is a side elevation view of a safety lock in a position that locks the camlock and releases the gate valve.
Figure 7:
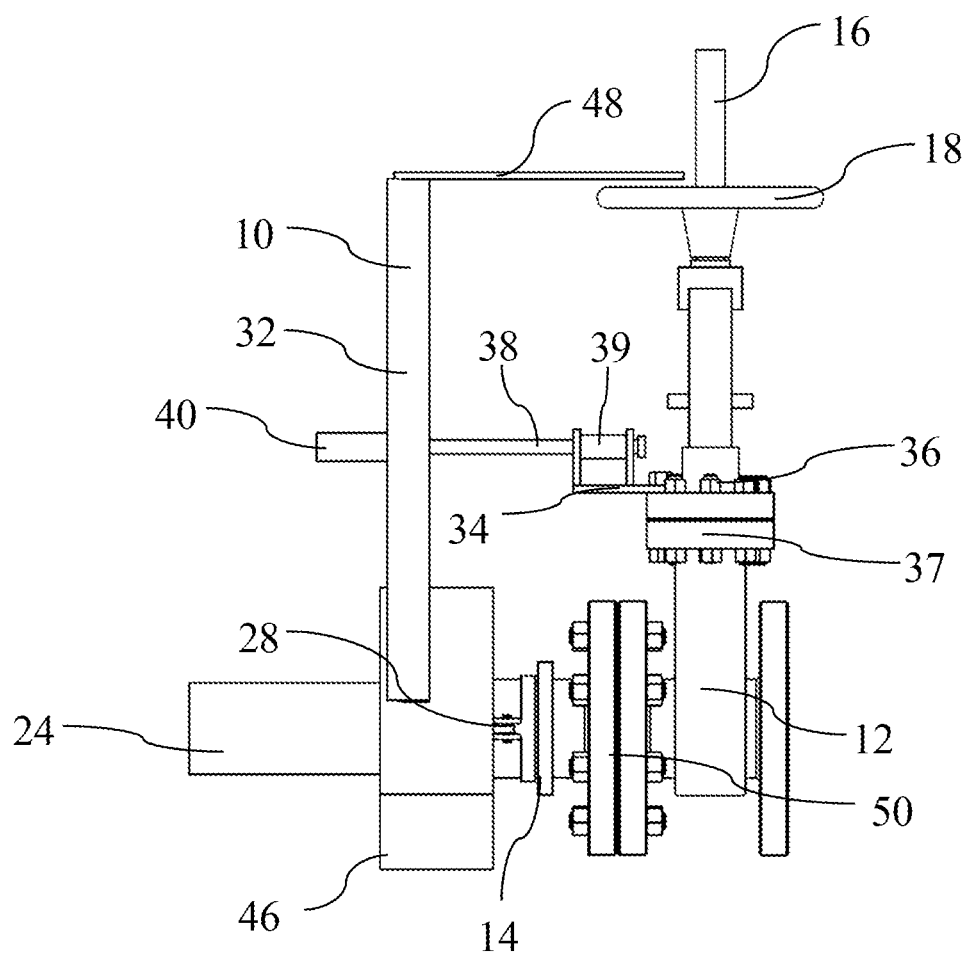
FIG. 7 is a side elevation view of a safety lock in a position that releases the camlock and locks the gate valve.

Once camlock fitting 14 is connected and locking arms 28 pivoted to the closed position, movable body 32 can then be moved laterally to the extended position as shown in FIG. 6, such that camlock shroud 46 is disposed over camlock fitting 14 and gate valve blocking member 48 is retracted sufficiently from gate valve 12 to allow actuator shaft 16 to move and therefore allow gate valve 12 to open, as shown in FIG. 7. As such, locking arms 28 of camlock fitting 14 are prevented from pivoting to an open position that would otherwise allow camlock fitting 14 to be disconnected.

As such, the two positions of movable body 32 allow safety device 10 to prevent gate valve 12 or camlock fitting 14 from opening at the same time and potentially causing a spill. It will also be noted that movable body 32 is be unable to be moved from the extended position to the retracted position. Similarly, if locking arms 28 are pivoted to the open position in order to make or break camlock fitting 14, movable body 32 will be unable to be moved to the extended position to release gate valve 12 until locking arms 28 are pivoted to the closed position.

It will be understood that safety device 10 cannot be used to prevent all spills, as there is nothing preventing movable body 32 from being moved to the extended position when there is no female connection 22 attached to male connection 20. However, the purpose is not to prevent abuse at a connection point, but rather to prevent most accidents that occur when either the operator is unaware that locking arms 28 are in a release position and gate valve 12 is subsequently opened, or when gate valve 12 is in the open position and locking arms 28 are subsequently pivoted to the release position.

Figure 8:
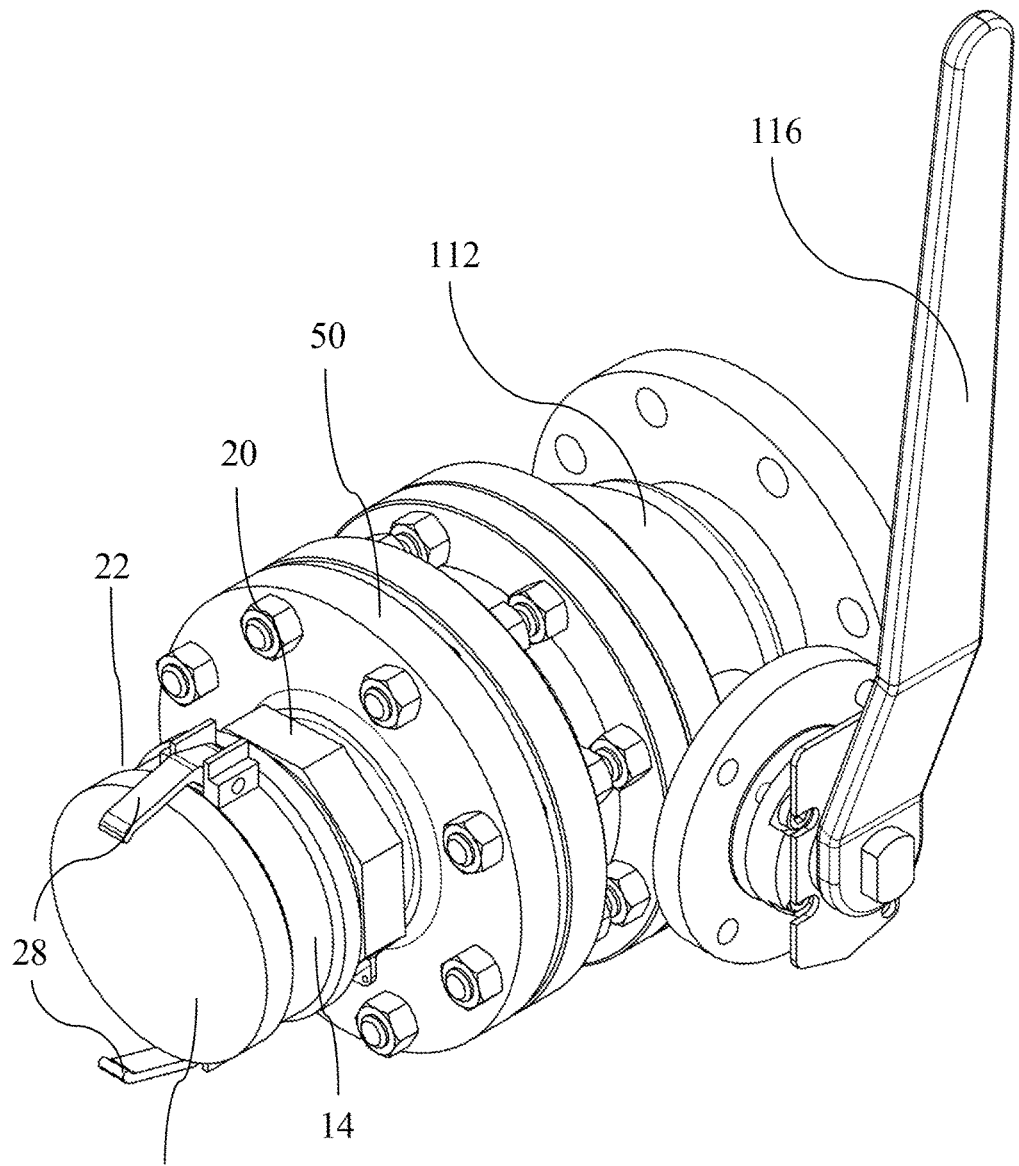
FIG. 8 is a perspective view of a prior art ball valve with camlock fitting.

Referring now to FIGS. 8-12, a ball valve version will now be described, with similar reference numbers being used for similar components. FIG. 8 shows an unmodified ball valve 112. The operation of safety device 10 is similar to what is described above as safety device 10 includes movable body 32 that moves between an extended and a retracted position to alternately engage locking arms 28 of camlock fitting 14, or to engage ball valve 112. As can be seen, the main difference is the manner in which movable body 32 engages ball valve 112 instead of gate valve 12, as ball valve 112 is actuated using a handle 116 as an actuator that is pivotally connected to move the internal sealing element (not shown) in ball valve 112. Movable body 32 carries a ball valve blocking member 148 that interacts with handle 116, and in particular, with a locking plate 152 that pivots with handle 116. Locking plate 152 has a blocking surface 150 that allows or blocks lateral movement of valve blocking member 148 as described below. As shown, locking plate 152 is mounted to move with handle 116, but may take other forms.

Figure 9:
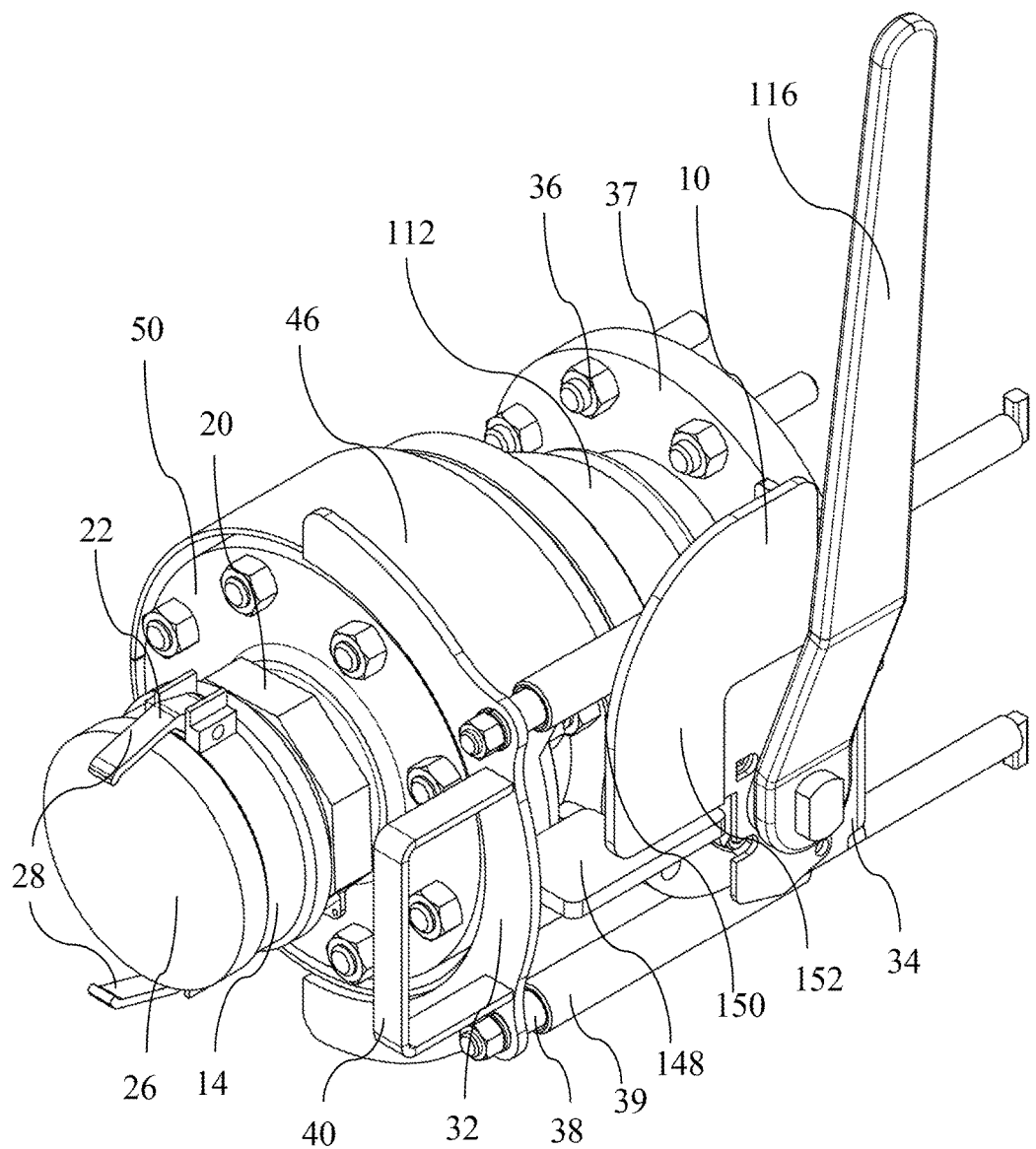
FIG. 9 is a perspective view of a safety lock installed on a capped flow line with a ball valve.
Figure 10:
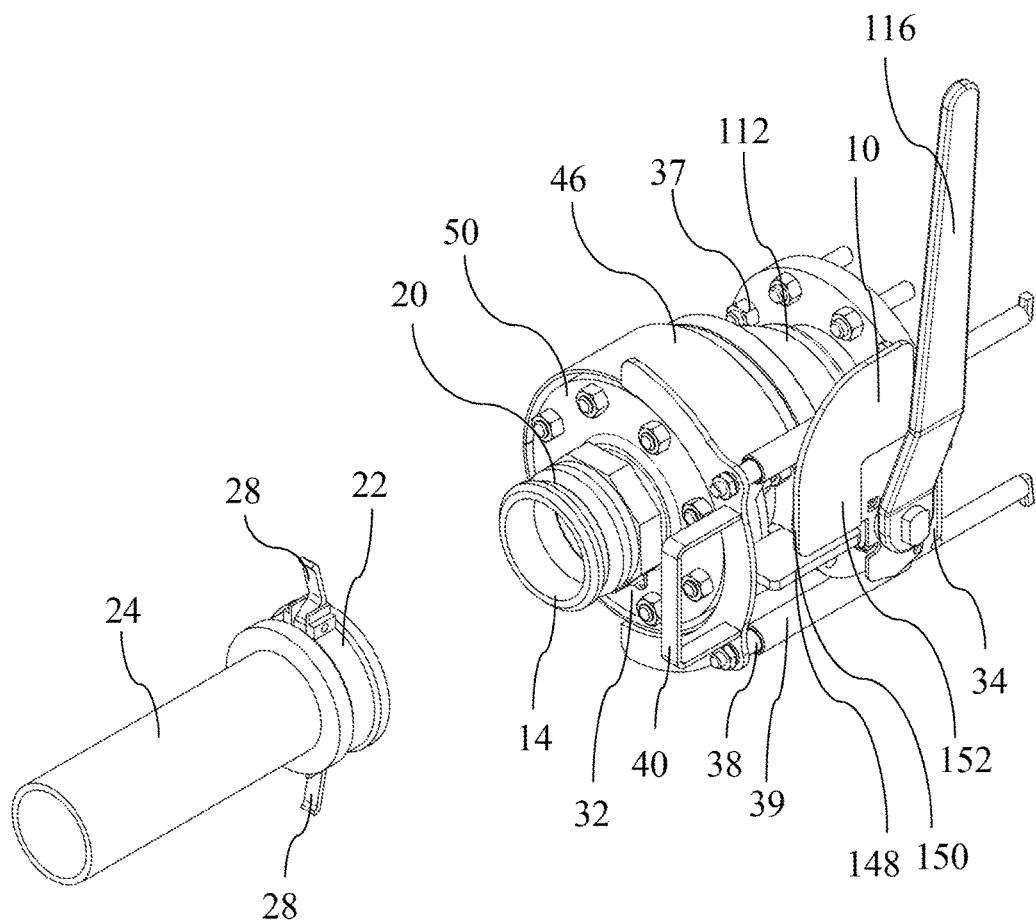
FIG. 10 is a perspective view of a safety lock with a disconnected hose adjacent to the ball valve.

Referring to FIG. 9, when ball valve 112 is closed, and handle 116 is in the closed position, movable body 32 is positioned in the retracted position, where shroud 46 is spaced from camlock fitting 14 and allowing camlock fitting 14 to be opened. Handle 116 is blocked from rotating by the engagement of blocking member 148 with locking plate 152. As shown in FIG. 10, in this position cap 26 may be removed, and hose 24 may be connected, or vice versa.

Figure 11:
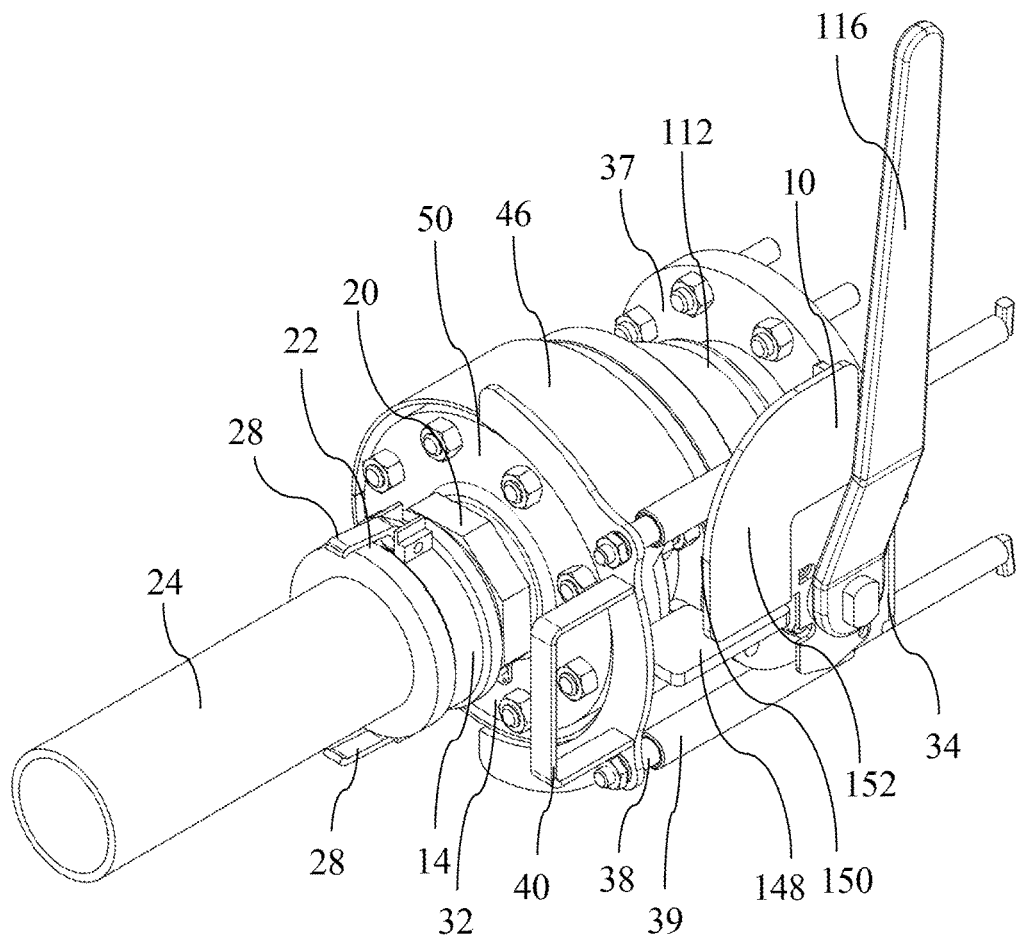
FIG. 11 is a perspective view of a safety lock in a position that locks the ball valve as the hose is connected or disconnected.

Referring to FIG. 11, hose 24 may, for example, be connected and camlock fitting 14 closed, or camlock fitting 14 opened and hose 24 removed as the case may be. In either case, with movable body 32 retracted to allow access to camlock fitting 14, handle 116 is prevented from being used to open ball valve 112.

Figure 12:
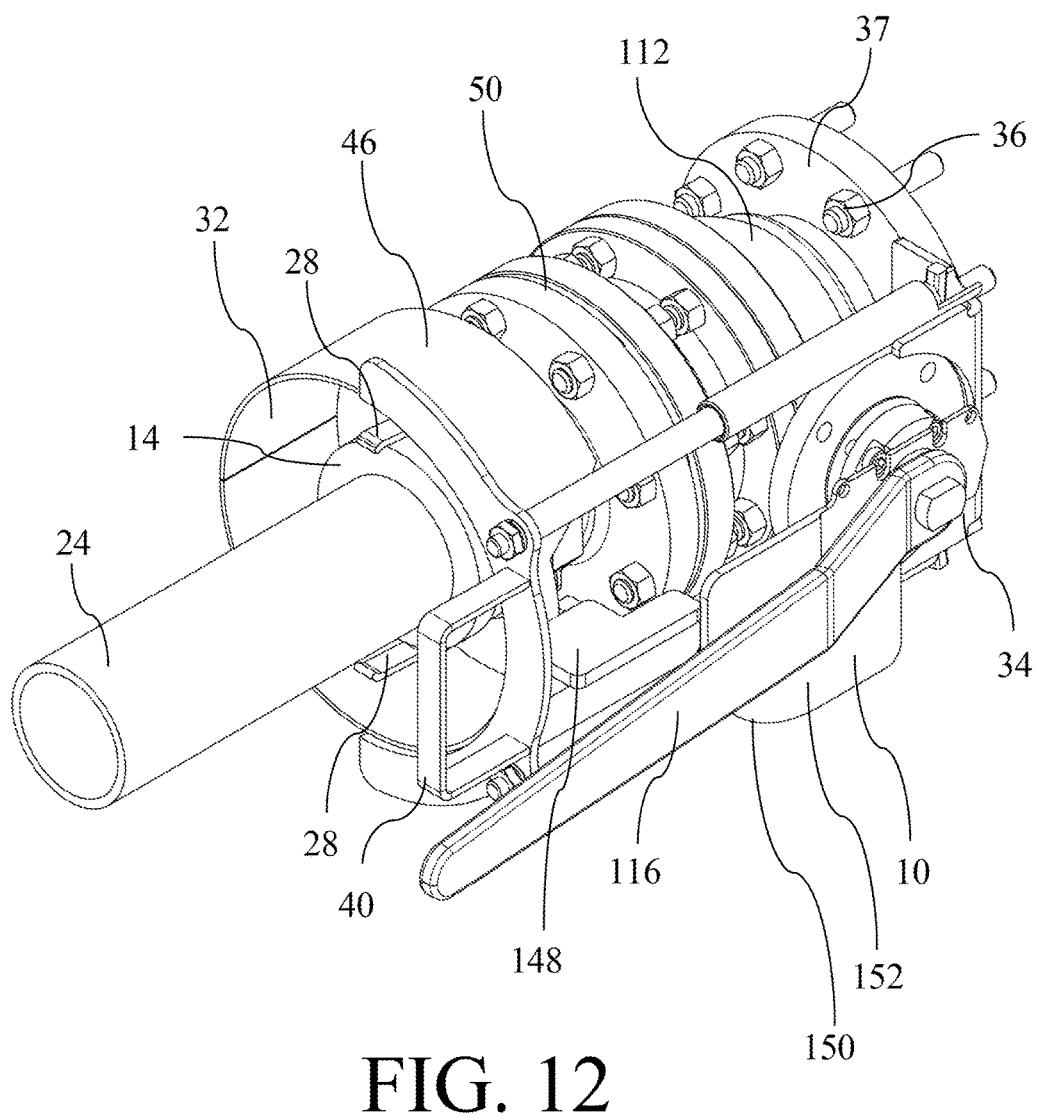
FIG. 12 is a perspective view of a safety lock in a position that locks the camlock and releases the ball valve.

Referring to FIG. 12, with locking arms 28 pivoted to the closed position, movable body 32 can be moved from the retracted position to the extended position. In doing so, blocking member 148 moves out of engagement with locking plate 152, which then allows handle 116 to be pivoted to the open position. As shown, once handle 116 is in the open position, blocking member 148 will engage blocking surface 150 of locking plate 152 to prevent movable body 32 from moving to the retracted position and preventing shroud 46 from being withdrawn from locking arms 28 from camlock fitting 14.

It will be understood by one skilled in the art that plates 148 and 152 may take other forms that restrict movement as described to allow or prevent pivotal movement of handle 116 and lateral movement of movable body 32 as described above. For example, plate 152 may also be circular or semi-circular and have a slot that receives blocking member 148. Blocking member 148 may be a pin that engages blocking surface 150. Plate 148 may be shaped such that it directly engages movable body 32 when handle 116 is horizontal, and to disengage from movable body 32 when handle 116 is vertical.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

The invention claimed is:

1. A safety lock for a hose connector and valve on a flow line, the valve comprising an actuator that moves between a first position and a second position as the valve moves between an open position and a closed position, respectively, the safety lock comprising:
   an anchor that is in a fixed position relative to the valve;
   a movable body movably attached to the anchor, the anchor permitting lateral movement of the movable body in an axial direction of the flow line between a first position and a second position, the movable body maintaining a common orientation relative to the flow line in the first position and the second position;
   a shroud and an actuator blocking member carried by and movable laterally with the movable body, wherein:
      the shroud is sized and positioned on the movable body to limit access to the hose connector when the movable body is in the first position and to permit access to the hose connector when the movable body is in the second position; and
      the actuator blocking member is sized and positioned on the movable body to prevent the actuator from moving from the second position to the first position when the movable body is in the second position, and to permit movement of the actuator when the movable body is in the first position.

2. The safety lock of claim 1, wherein the hose connector is a camlock fitting comprising a male connector and a female connector, one of the male connector and the female connector being mounted to the flow line, the female connector having one or more locking arms that pivot between a locked position and an unlocked position to selectively lock the female connector to the male connector; and
   the shroud is sized and positioned on the movable body to prevent pivotal movement of the one or more locking arms of the female connector from the locked position when the movable body is in the first position and to permit pivotal movement of the locking arms when the movable body is in the second position.

3. The safety lock of claim 1, wherein the valve is a gate valve, the actuator is an actuator shaft, and the first and second positions of the actuator shaft are extended and retracted positions relative to the gate valve.

4. The safety lock of claim 3, wherein the actuator blocking member is positioned to block the movable body from moving to the second position when the actuator shaft is in the extended position.

5. The safety lock of claim 3, wherein the shroud is attached to a bottom of the movable body, and the gate valve blocking member is attached to a top of the movable body, the actuator blocking member being positioned above and extending toward the gate valve.

6. The safety lock of claim 3, wherein the actuator shaft comprises a threaded shaft that is operated by a hand wheel.

7. The safety lock of claim 1, wherein the valve is a ball valve, the actuator is a handle that is pivotally attached to the ball valve, and the first and second positions of the handle are first and second pivotal positions relative to the ball valve.

8. The safety lock of claim 7, wherein the handle comprises a plate that pivots with the handle, the actuator blocking member engaging the plate to prevent the handle from moving from the second position to the first position when the movable body is in the second position.

9. The safety lock of claim 1, wherein the anchor engages the movable body by a sliding connection that slides in a direction that is parallel to a flow axis of the flow line.

10. The safety lock of claim 1, wherein the shroud and the actuator blocking member are fixedly attached to the movable body.

11. The safety lock of claim 2, wherein the shroud is a camlock shroud comprising an enclosure that radially encloses the camlock fitting.

12. The safety lock of claim 1, wherein the anchor comprises one or more apertures that slidably receive elongate members of the movable body.

13. The safety lock of claim 1, wherein the anchor is attached to one or more flange bolts of a flange of the valve.

14. The safety lock of claim 1, wherein the shroud is sized to receive a flowline flange in the second position.

15. In combination:
   a hose connector connected to a flow line;
   a valve connected to the flow line adjacent to the hose connector, the valve comprising an actuator that moves between a first position when the valve is in an open position and a second position when the valve is in a closed position; and a safety lock comprising:
  an anchor that is in a fixed position relative to the valve;
  a movable body movably attached to the anchor, the anchor permitting lateral movement of the movable body in an axial direction of the flow line between a first position and a second position, the movable body maintaining a common orientation relative to the flow line in the first position and the seond position; and
  a shroud and an actuator blocking member carried by and movable laterally with the movable body, wherein:
    the shroud is sized and positioned on the movable body to limit access to the hose connector when the movable body is in the first position and to permit access to the hose connector when the movable body is in the second position; and
    the actuator blocking member is sized and positioned on the movable body to prevent the actuator from moving from the second position to the first position when the movable body is in the second position, and to permit movement of the actuator when the movable body is in the first position.

16. The combination of claim 15, wherein the hose connector is a camlock fitting comprising one of a male connector and a female connector, the female connector having pivoting locking arms that selectively lock the female connector to the male connector; and
  the shroud is sized and positioned on the movable body to prevent pivotal movement of the locking arms of the female connector from a locked position when the movable body is in the first position and to permit pivotal movement of the locking arms when the movable body is in the second position.

17. The combination of claim 15, wherein the valve is a gate valve, the actuator is an actuator shaft, and the first and second positions of the actuator shaft are extended and retracted positions relative to the gate valve.

18. The combination of claim 17, wherein a gate valve blocking member is positioned to block the movable body from moving to the second position when the actuator shaft is in the extended position.

19. The combination of claim 17, wherein the shroud is attached to a bottom of the movable body, and a gate valve blocking member is attached to a top of the movable body, the gate valve blocking member being positioned above and extending toward the gate valve.

20. The combination of claim 17, wherein the actuator shaft comprises a threaded shaft that is operated by a hand wheel.

21. The combination of claim 15, wherein the valve is a ball valve, the actuator is a handle that is pivotally attached to the ball valve, and the first and second positions of the handle are first and second pivotal positions relative to the ball valve.

22. The combination of claim 21, wherein the handle comprises a plate that pivots with the handle, the actuator blocking member engaging the plate to prevent the handle from moving from the second position to the first position when the movable body is in the second position.

23. The combination of claim 15, wherein the anchor engages the movable body by a sliding connection that slides in a direction that is parallel to a flow axis of the flow line.

24. The combination of claim 15, wherein the shroud and the actuator blocking member are fixedly attached to the movable body.

25. The combination of claim 16, wherein the shroud is a camlock shroud comprising an enclosure that radially encloses the camlock fitting.

26. The combination of claim 15, wherein the anchor comprises one or more apertures that slidably receive elongate members of the movable body.

27. The combination of claim 15, wherein the anchor is attached to one or more flange bolts of a flange of the valve.

28. The combination of claim 15, wherein the shroud is sized to receive a flowline flange in the second position.

* * * * *